United States Patent [19]
Horiuchi

[11] Patent Number: 6,068,224
[45] Date of Patent: May 30, 2000

[54] CAMERA SUPPORTING STRUCTURE

[76] Inventor: Kengo Horiuchi, 8-6, Ootecho, Koga-shi, Ibaraki 306, Japan

[21] Appl. No.: 09/066,484
[22] PCT Filed: Aug. 20, 1997
[86] PCT No.: PCT/JP97/02887
  § 371 Date: Apr. 23, 1998
  § 102(e) Date: Apr. 23, 1998
[87] PCT Pub. No.: WO98/09193
  PCT Pub. Date: Mar. 5, 1998

[30] Foreign Application Priority Data

Aug. 27, 1996 [JP] Japan .................................. 8-262241

[51] Int. Cl.[7] ................................................... F16M 11/04
[52] U.S. Cl. .................. 248/187.1; 248/168; 248/176.1; 248/188
[58] Field of Search .......................... 248/179.1, 187.1, 248/188, 168, 160, 431, 432, 440, 170; 354/81

[56] References Cited

U.S. PATENT DOCUMENTS

| | | | |
|---|---|---|---|
| 2,502,667 | 4/1950 | Pagett | 248/261 |
| 3,282,530 | 11/1966 | Rash | 242/127 |
| 3,881,675 | 5/1975 | Matchett | 248/170 |
| 3,921,947 | 11/1975 | Adam | 248/169 |
| 4,085,915 | 4/1978 | Song et al. | 248/187 |
| 4,317,552 | 3/1982 | Weidler | 248/168 |
| 4,570,887 | 2/1986 | Banister | 248/187 |
| 5,043,750 | 8/1991 | Yamaguchi | 354/81 |
| 5,267,712 | 12/1993 | Shen | 248/179 |
| 5,303,890 | 4/1994 | Carruth | 248/118 |
| 5,390,885 | 2/1995 | Shen | 248/168 |
| 5,647,565 | 7/1997 | Wei | 248/168 |
| 5,772,164 | 6/1998 | Shen | 248/170 |

*Primary Examiner*—Ramon O. Ramirez
*Assistant Examiner*—Tan Le
*Attorney, Agent, or Firm*—Morgan & Finnegan, LLP

[57] ABSTRACT

A camera supporting structure comprises a plurality of flexible legs (2) each of which has a leg supporting member (3) at an end thereof, a first member (4) and a second member (5) arranged parallel to each other at a spaced interval for supporting said flexible legs, and a camera attaching screw (1) for attaching the camera to the first member and the second member, said first member being placed adjacent to the camera attached and having an inner screw (42) engaging with said camera attaching screw. By screwing the camera attaching screw into the inner screw, the leg supporting members are supported between the first member and the second member. The camera is screwed onto the camera supporting structure by the camera attaching screw and abutted onto a setting place by bending the flexible legs. The flexible legs are adjustably bent to support the camera that is oriented toward a subject of the photograph.

5 Claims, 10 Drawing Sheets

CAMERA SUPPORTING STRUCTURE

TECHNICAL FIELD

This invention relates to a camera supporting structure for setting a camera, more particularly, a camera supporting structure capable of supporting a camera on an inclined surface and so on and having portability.

BACKGROUND OF THE INVENTION

Most conventional camera supporting structures are large-sized types although cameras are decreased in size, and so the camera is not accommodated into a camera cover or the like while being attached onto the camera supporting structure. The camera should be attached onto and detached from the camera supporting structure every in using, resulting in a burdensome operation. The camera supporting structure is a nuisance to portability of the camera; moreover it is inconvenient for a person who seldom uses it.

Concerning a small-sized camera supporting structure, the legs are secured to a base in the vertical direction and a folding-joint of each leg is large, so that the camera is not also accommodated into the camera cover as being attached onto the camera supporting structure. Further, the camera is only transversely attached onto the camera supporting structure when the legs are fixed on the ground or the like, thus producing disadvantages that the camera is not oriented for the photographing subjects at various angles, and the like.

For example, when a group of people takes a photograph of themselves, a person other than the group of people photographs them or the camera is directly put on somewhere. In the former, the sufficient photograph is not taken because the unfamiliarity with the camera results in out of focus photographs or camera shake. In the latter, it is expected that the camera may be turned over or fallen by being put on an unstable place, and further it is difficult to adjust an angle toward the photographing subject.

It is an object of the present invention to provide a camera supporting structure which is small in size and light in weight, and is smoothly accommodated into a camera cover while being attached to the camera, and in which the camera is transversely and vertically attached onto the camera supporting structure in taking a photograph.

DISCLOSURE OF THE INVENTION

The present invention is a camera supporting structure for supporting a camera oriented toward a subject of the photograph, which includes a base having a face proximately facing or intimately contacting to the peripheral face of an inner screw formed in the camera; plural flexible legs extending from the base toward the outside; and a screw for attaching the camera onto the base.

The present invention is a camera supporting structure for supporting a camera oriented toward a subject of the photograph, and is characterized by including plural flexible legs, a first member and a second member placed parallel to the first member at a spaced interval, a leg supporting member fixed at an end of the flexible leg, and a screw for attaching the camera to the first member and the second member, said first member being placed adjacent to the camera attached and having an inner screw engaging with said screw for attaching the camera, the leg supporting member being placed between the first member and the second member and the flexible leg being fixed to a side portion of the leg supporting member.

Another invention is a camera supporting structure for supporting a camera oriented toward a subject of the photograph, comprising plural flexible legs, a first member a second member placed parallel to the first member at a spaced interval, a slider arranged slidably between and along the first member and the second member to rotate with respect to the first member and the second member, and a screw for attaching the camera which is formed on the second member, the first member being adjacent to the camera attached and having an inner screw for engaging with the screw for attaching the camera, at least one of the first and second members having a sliding guide for the slider, and the flexible leg being secured to the side portion of the slider.

Another invention is a camera supporting structure for supporting a camera oriented toward a subject of the photograph, comprising plural flexible legs, a first member and a second member having a through-hole having a through-hole and placed parallel to each other and at a spaced interval, means for coupling the first member and the second member, a leg supporting member secured at an end of the flexible leg, a sleeve inserted into the through-holes of the coupled first and second members to rotate, and a screw for attaching the camera which is passed through the sleeve and protrudes from the first members the leg supporting member being placed between the first member and the second member, and the flexible leg is secured to the leg supporting member.

Another invention is a camera supporting structure for supporting a camera oriented toward a subject of the photograph, comprising plural flexible legs, a leg supporting member secured to an end of the flexible leg, a screw for attaching the camera to the camera supporting structure, a base having a leg-attachment for attaching the leg supporting members to rotate, a through-hole passing the screw for attaching the camera and a face intimately contacting the peripheral face of an inner screw formed in the camera, and means provided for limiting the rotation of the flexible leg between the leg supporting member and the leg attachment.

The other invention is a camera supporting structure for supporting a camera oriented toward a subject of the photograph, comprising plural flexible legs, a leg supporting member secured to an end of the flexible leg, and a screw for attaching the camera to the camera supporting structure, said leg supporting member being formed of a plate-shaped member having a through-hole passing the screw for attaching to the camera, and the flexible legs each having a different position for coupling with the plate-shaped member from one another.

According to the present invention, the screw for attaching the camera is screwed with the camera, and then the flexible legs are bent and fixed on a place where the camera is set up. At this time, the flexible legs are adjustably bent to support the camera that is oriented toward a subject of the photograph. After taking the photograph, the camera supporting structure can be carried while being attached to the camera. And further, the flexible legs are bent along the camera body, so that the flexible legs are not a nuisance to the carry of the camera. The base is formed to have a similar thickness to the diameter of the flexible leg, and to have the outer diameter which is sized not to project from the camera body, so that the combination of the camera supporting structure and the camera can be accommodated into a camera cover that is formed to be slightly larger than usual, thus enhancing the convenience.

As preferred embodiment of the present invention, the sliders are moved to agree with the orientation of setting the legs to open the legs, and the camera is oriented toward the subject of the photograph by bending the legs to fit to a configuration or an uneven surface of a place when setting the camera. After taking the photographs, all the flexible legs are extended in the horizontal direction and collected at one place not to be a nuisance in use or in carrying of the camera. The flexible legs can be attached to and removed from the camera as necessary.

According to the present invention, the legs are provided on the face for attaching to the camera in the horizontal direction, so that the whole camera supporting structure results in a thinner type without any projection, thereby the camera supporting structure attached to the camera can be carried without nuisance to carry of the camera even when it is not used, and time and efforts for attaching to and detaching from the camera can be saved. The camera supporting structure is a small type, but the camera can be adjustably attached onto the camera supporting structure to be oriented in the transverse direction or the vertical direction in response to the required angle.

When the flexible legs are fully opened, the flexible legs can be hooked on, for example, a branch of a tree, thereby fixing the camera.

And the flexible legs are structured to open in the horizontal direction, so that a wide and stable place for setting up the camera can be easily obtained, thus reducing the fatigue of the flexible legs that is caused by repeatedly bending the legs.

BRIEF DESCRIPTION OF THE DRAWINGS

FIG. 15 is a perspective view for explaining yet another embodiment;

BEST MODE FOR WORKING THE INVENTION

Figure 1:
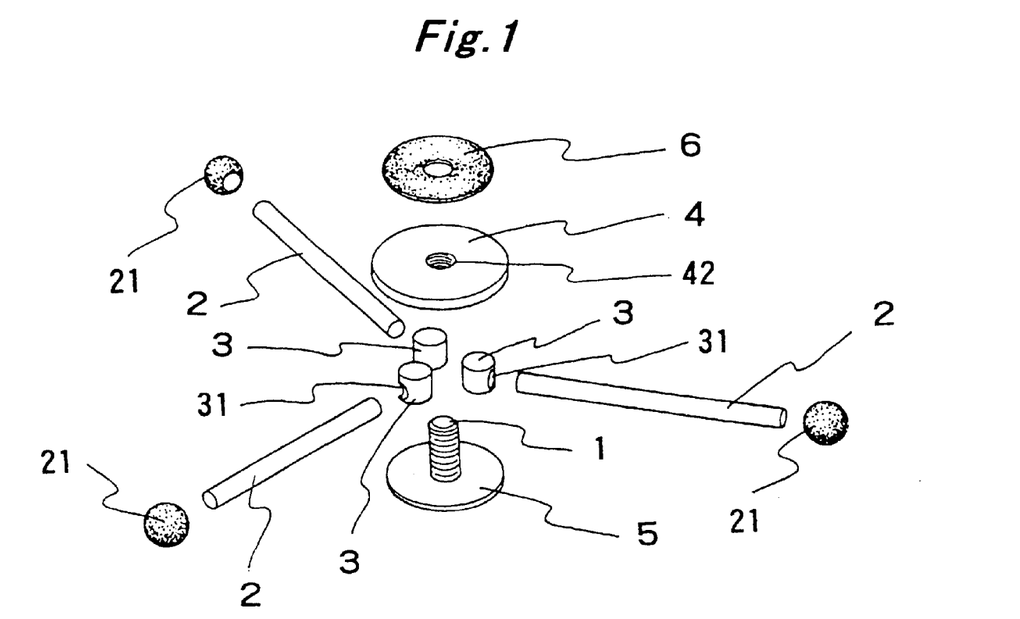
FIG. 1 is an exploded perspective view showing a camera supporting structure according to the present invention.
Figure 2:
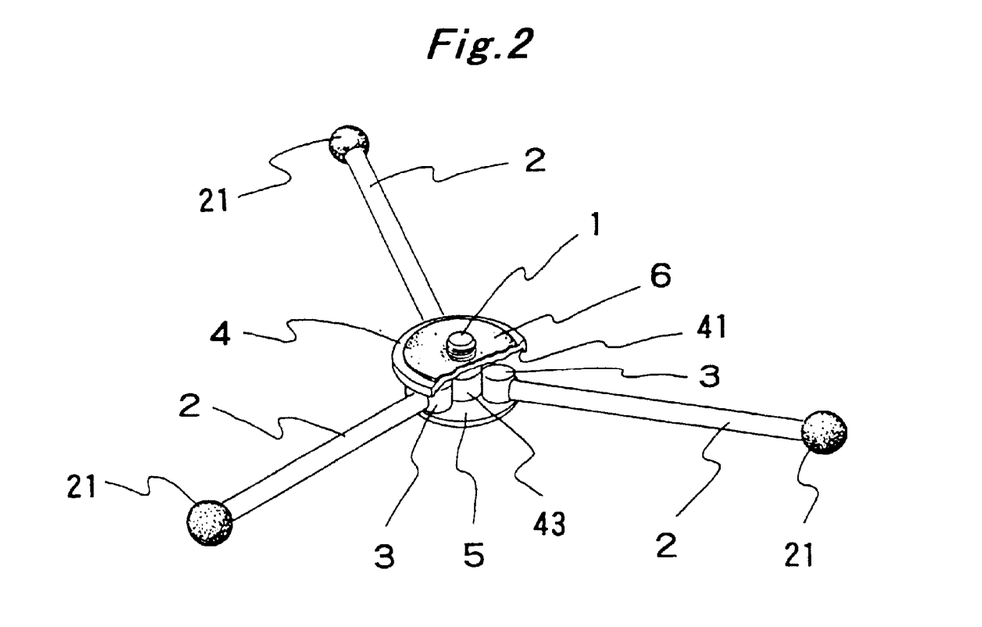
FIG. 2 is a partially cutaway perspective view of the camera supporting structure.
Figure 3:
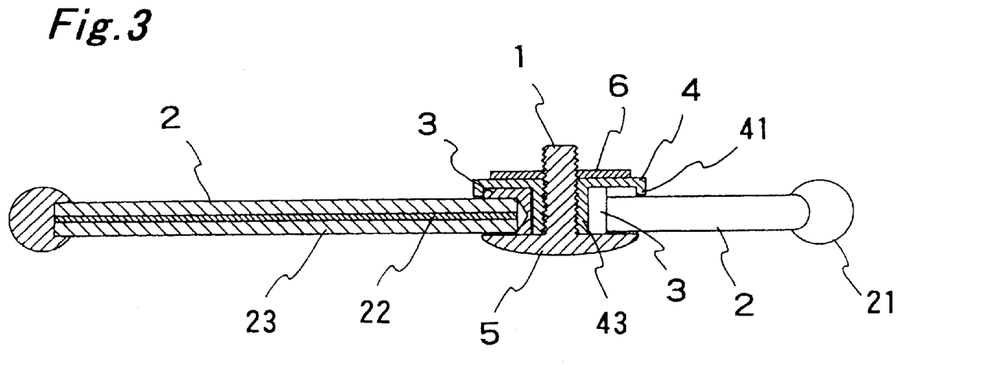
FIG. 3 is a sectional view of the camera supporting structure.

The preferred embodiments according to the present invention will be described below with reference to the attached drawings. FIG. 1 is a perspectively exploded view of a camera supporting structure according to the present invention. FIG. 2 is a partially cutaway perspective view of the assembled camera supporting structure. FIG. 3 is a sectional view of the camera supporting structure. A base is composed of a nut-shaped first member 4 formed of a thin disc and a bolt-shaped second member 5 having the head shaped in a similar size to the first member 4. The first member 4 is, in turn, composed of: a cylindrical nut 43 having an inner screw 42 which engages with a screw 1 for attaching a camera formed on the second member 5; and an annular wall 41 which is formed along the circumferential edge of the first member 4 to operate as a guide and fall-stopper of sliders 3. And further, a cushion 6 for attaching the camera is adhered on the surface of the first member 4 that faces to the camera. A flexible leg 2, having the length from approximately 60 mm to 120 mm and the diameter of approximately 6 mm, is fixed to the side portion of the slider 3. It is desirable that a non-slip means is formed between the sliders 3 and the second member 5.

The flexible leg 2 can freely bend as a flexible tube, an electric wire and so on, and is made of a material having such strength as to support the camera. It is advisable to fix a slip-proof member 21, such as a rubber ball, to each end of the legs 2. Where an electric wire is used for the leg 2, it is required not to slip off, for example, the metal core 22 and a vinyl cover 23 covering the metal core 22 each other, shown in FIG. 3.

The slider 3 can rotatably move between the first and second members 4 and 5. Therefore, the legs 2 move also, and further, are freely bent to correspond to the orientation of the camera toward a subject of the photograph. But, on a sloped place, an uneven place or the like, the weight of the camera is collected onto a specific one of the legs 2 or position of the legs 2 is unsteady so that the slider 3 moves, with the result that the camera should be set again. And, even on a flat place, the situation as described above is also created by an angle at which the camera is oriented toward the subject. In order that the legs securely support the camera in the usage patterns as described above, the preferred examples will be described below.

Figure 4:
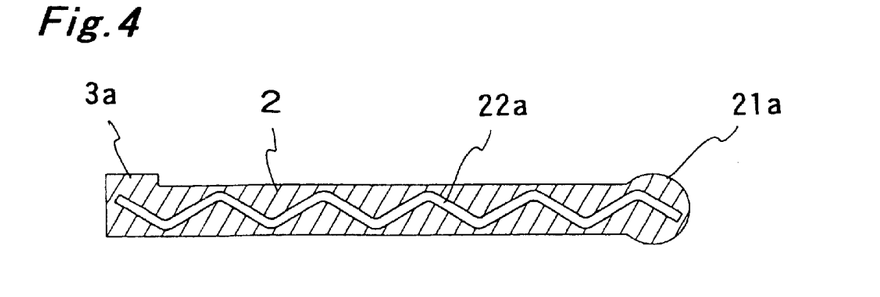
FIG. 4 is a sectional view of a flexible leg with a built-in wavy core wire.
Figure 5:
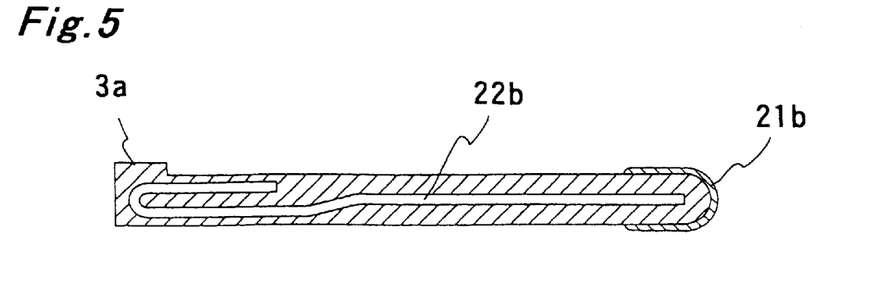
FIG. 5 is a sectional view of a flexible leg with a built-in core wire having a folded portion.
Figure 6:
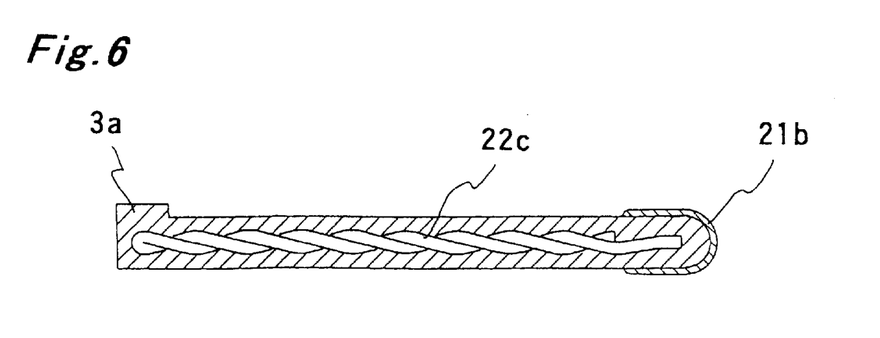
FIG. 6 is a sectional view of a flexible leg with a built-in twisted core wire.

Other examples of the flexible leg will be explained. As shown in FIG. 4, the leg 2 includes therein a wavy core wire 22a that is covered with a resin material, and is combinedly formed with a slider 3a and a slip-proof member 21a. In FIG. 5, the leg 2 includes therein a folded core wire 22b that is unequally folded in the side of the slider 3a to be a U-shape. In FIG. 6, the leg 2 includes therein a twisted core wire 22c that is formed by folding and twisting a wire or by twisting two wires. A numeral 21b shows a slip-proof member made of a different material from that of the leg 2.

Figure 7:
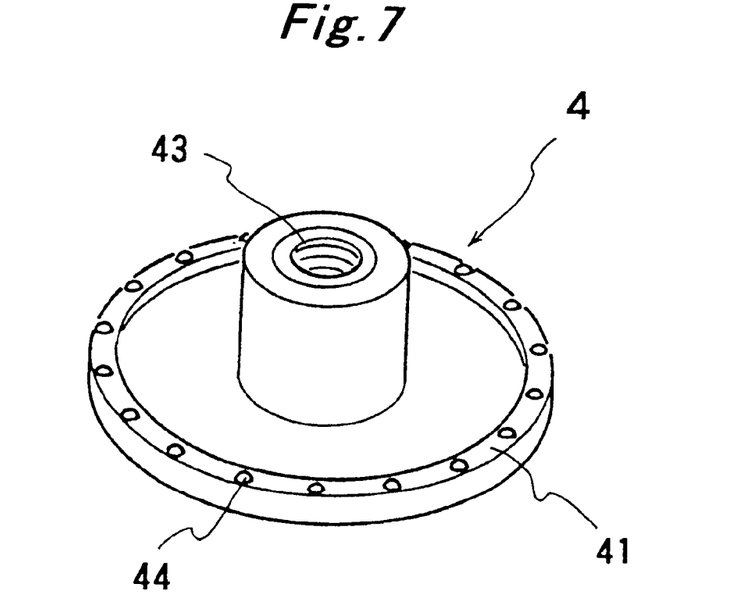
FIG. 7 is a perspective view of a first member.
Figure 8:
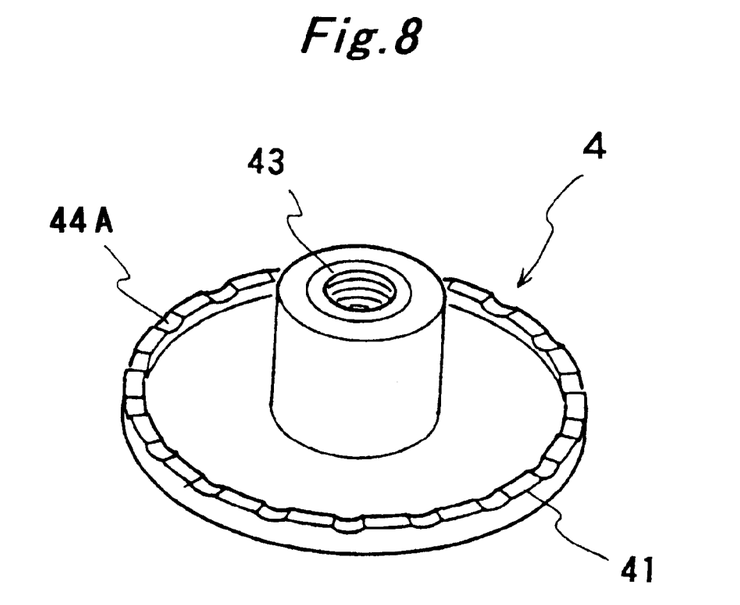
FIG. 8 is a perspective view of the first member.

Concerning a swing-proof system shown in FIG. 7, knocks (whirl-stop) 44 are formed at spaced intervals, corresponding to the diameter of the flexible leg 2, to be projected from the side face of the annular wall 41 formed in the first member 4. After the legs 2 are each located between the knocks 44 formed on the first member 4, the second member 5 is screwed onto the first member 4, thereby the sliders 3 are clamped and supported by the members 4 and 5. With the above structure, the legs 2 are positioned with the knocks 44, thus preventing the legs from swinging and stably putting the camera. An example shown in FIG. 8 forms recesses 44A for putting the leg 2 instead of the knocks 44. The legs 2 are each placed into the recess 44A, and then the second member 5 is screwed with the first member 4, thereby obtaining the above effects.

Figure 9:
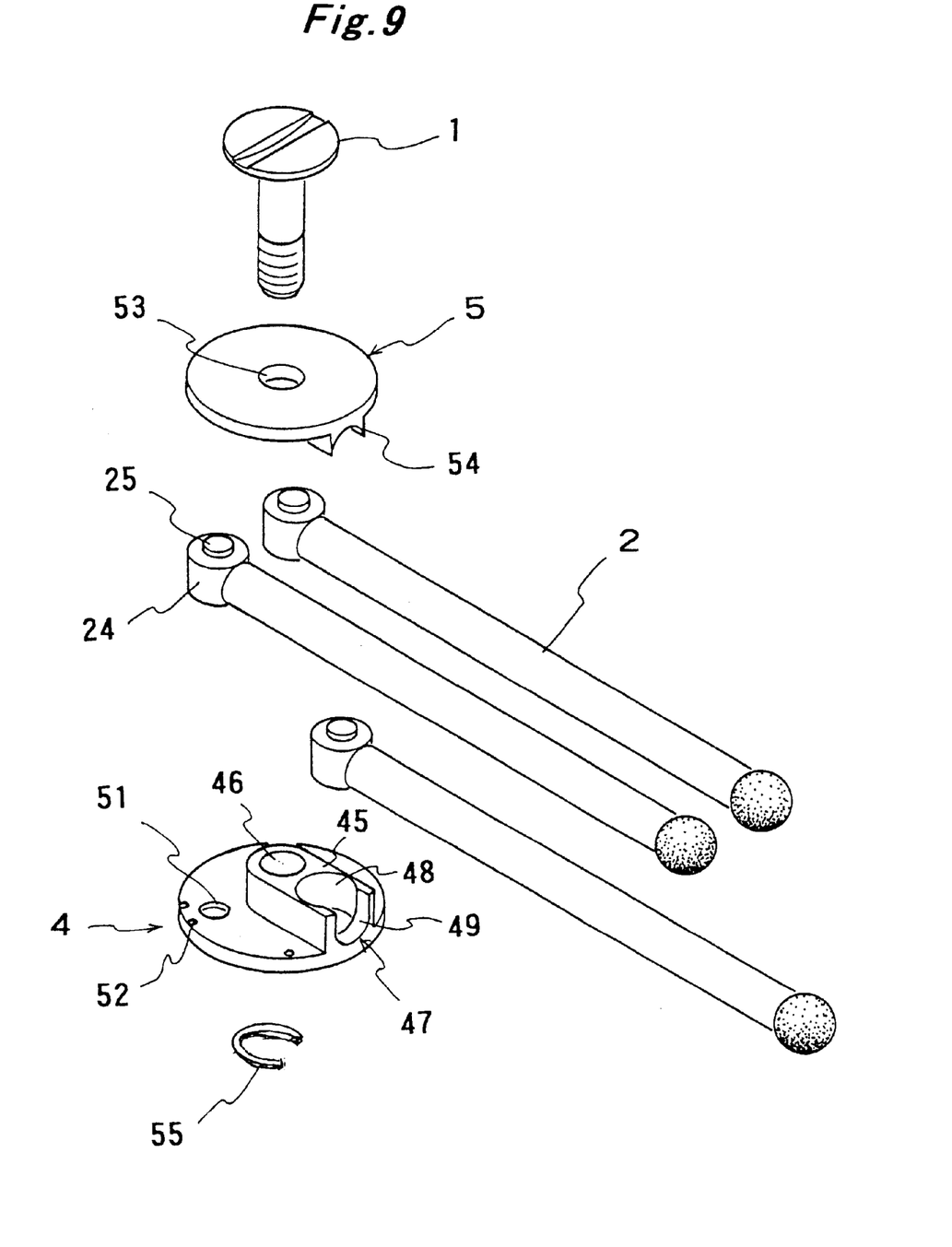
FIG. 9 is an exploded perspective view for explaining another embodiment.
Figure 10:
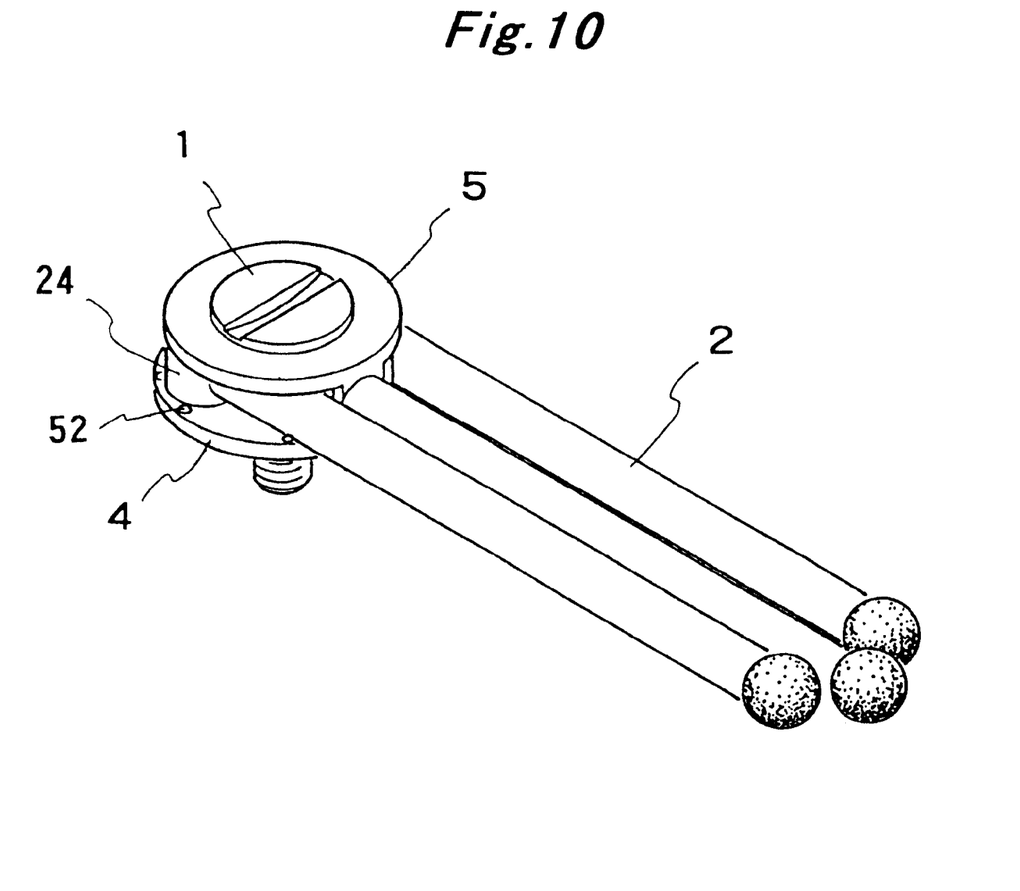
FIG. 10 is a perspective view of the camera supporting structure shown in FIG. 9.

FIG. 9 is an exploded perspective view of another embodiment according to the present invention. FIG. 10 shows an assembled view of FIG. 9. In the embodiment, one of the legs 2 is stationary, and the other two legs 2 are rotatable between the members 4 and 5. The first member 4 includes a projection 45 from the center to the circumference. The projection 45 has a through-hole 46 and a leg fixing portion 47. The leg fixing portion 47 is composed of a cavity 48, having a circular side-wall, which engages with a leg supporting portion 24 fixed at the end of the leg 2, and a recess 49 which is slightly wider than the diameter of the leg 2 and has an opening at its side toward the outside. A shaft portion 25 is combinedly formed on both side faces of the leg supporting portion 24. And further, the first member 4 has two shaft holes 51 for rotatably supporting the two legs 2, in which the shaft portions 25 of the leg supporting portions 24 are thrust into the shaft holes 51. Two projected knocks 52 are formed adjacent to the circumferential edge of the first member 4 to face each other with the shaft hole 51 therebetween.

The second member 5 is formed of a through-hole 53 at the center of the member 5 for passing the screw 1 and a leg clamping portion 54 in order to clamp the end of the leg 2 to the circumferential edge of the member 5. The leg clamping portion 54 is located to face with the recess 49 that is formed in the projection 45 of the first member 4, of which tip end portion has a concave circular arch shaped surface to correspond to the outer shape of the leg 2.

Explaining about assembling the legs 2, the stationary leg 2 is positioned at the projection 45 of the first member 4. At this time, the shaft portion 25 is thrust into a shaft hole formed on the bottom of the cavity 48. The rotatable legs 2 are each positioned between the knocks 52 to thrust the shaft portion 25 of the leg supporting portion 24 into the shaft hole 51. The second member 5 is laid onto the first member 4 to clamp the stationary leg 2, placed into the project 45, with the leg clamping portion 54. After that, the screw 1 is passed from the outer face of the second member 5 through the holes 53 and 46 to the outer face of the first member 4. And then a C-shaped snap-ring 55 is fit into the thread of screw 1 protruding from the outer face of the first member 4, thereby joining the first member 4 and the second member 5.

According to this embodiment, with the stationary flexible leg and the two rotatable flexible legs, the direction of the legs 2 can be adjusted by loosening the screw 1 and rotating the rotatable legs 2, thus easily setting up the camera to face toward the subject of the photograph.

Figure 11:
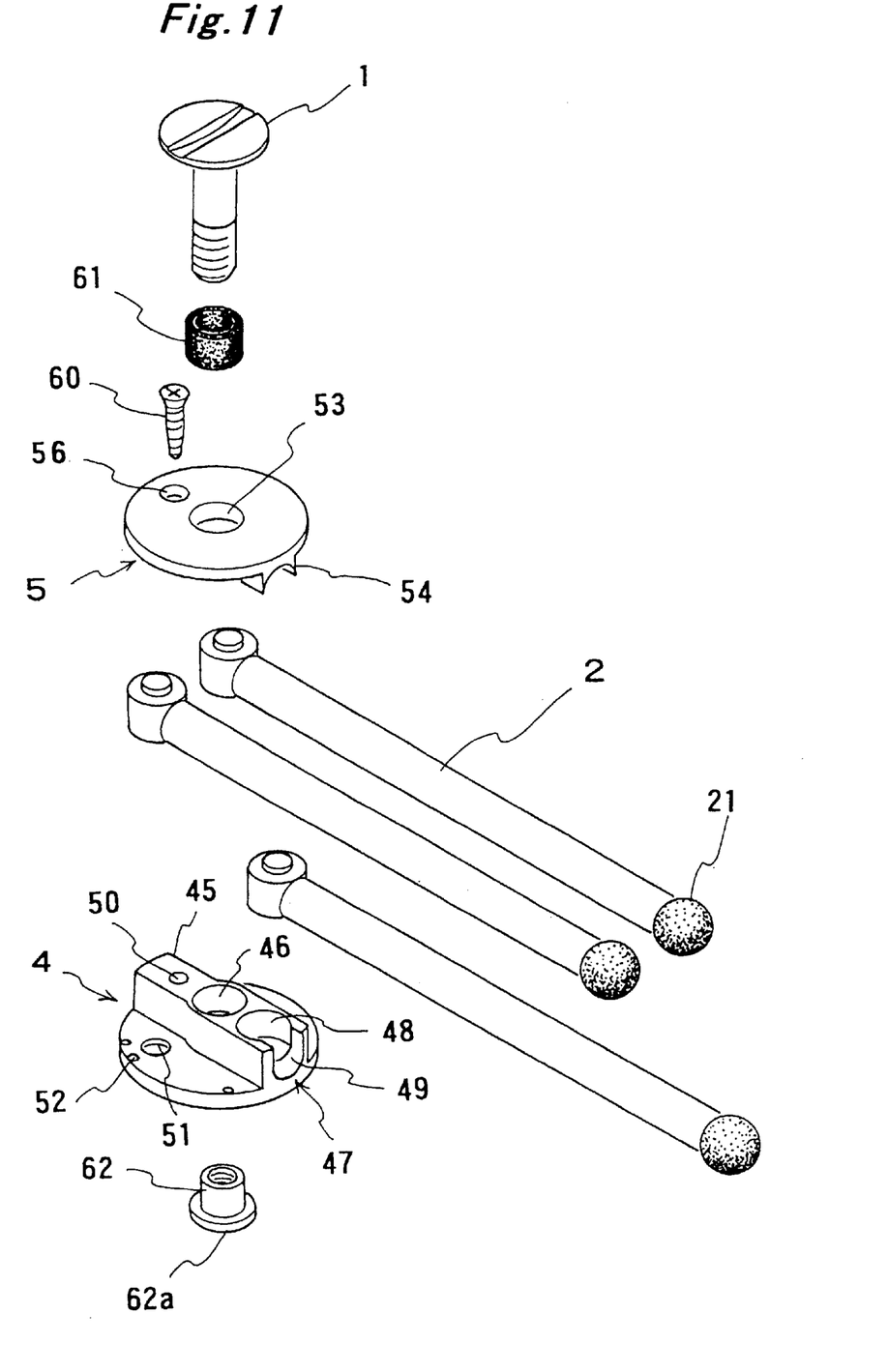
FIG. 11 is an exploded perspective view showing a modification of the embodiment of FIG. 9.

FIG. 11 is an exploded perspective view showing a modification of the embodiment described above. In the modification, the direction of the legs 2 can be adjusted without loosening the screw 1. Here, different structures from that of FIG. 9 will be explained. The projection 45 is formed along the diameter of the first member 4, in which the leg fixing portion 47 is formed at the end of the projection 45 and a screw receiving hole 50 is formed at the other end for screwing the second member 5 onto the first member 4. The second member 5 is provided with the through-hole 53 through which the bolt 1 is passed, the leg clamping portion 54 for clamping the end of the leg 2 at the circumferential end of the members 4 and 5, and a small-screw through-hole 56 separate from the through-hole 53. The through-hole 46 of the first member 4 has the same diameter as that of the through-hole 53 of the second member 5, and a rubber tube 61 is inserted into the holes 46 and 53. A tubular nut 62 having a slightly smaller diameter than that of the rubber tube 61 is inserted into the rubber tube 61 to engage with the bolt 1.

Explaining about assembling the legs 2, after the stationary leg 2 and the rotatable legs 2 are placed between the first member 4 and the second member 5, the members 4 and 5 are mutually coupled with a small-screw 60. After the rubber tube 61 is inserted into the through-holes 46 and 53 and the bolt 1 is passed from the second member 5 to the first member 4, the nut 62 is engaged with the bolt 1 protruding from the through-hole 46. Then thrust into between the bolt 1 and the rubber tube 61 in the holes 46 and 53 until a collar 62a of the nut 62 is abutted on the surface of the first member 4. As a result, the camera is attached onto the supporting structure by using the bolt 1 protruding from the first member 4.

In this modification, the combination of the first and second members can freely be rotated around the rubber tube. In other word, the direction of the legs can be changed without loosening the bolt.

Figure 12:
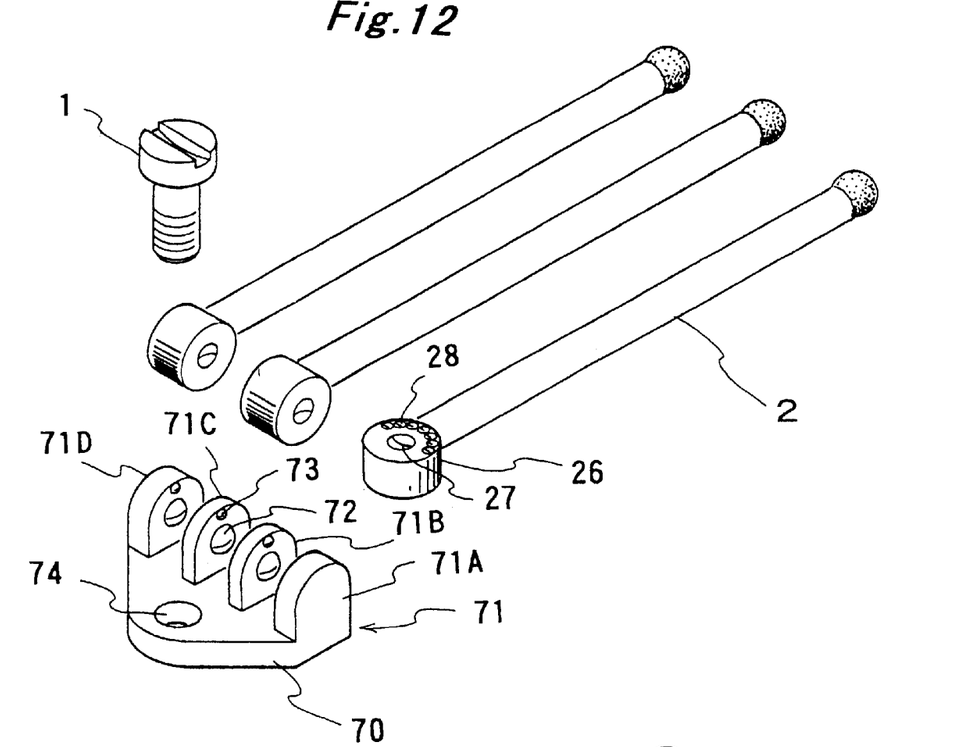
FIG. 12 is an exploded perspective view for explaining still another embodiment.
Figure 13:
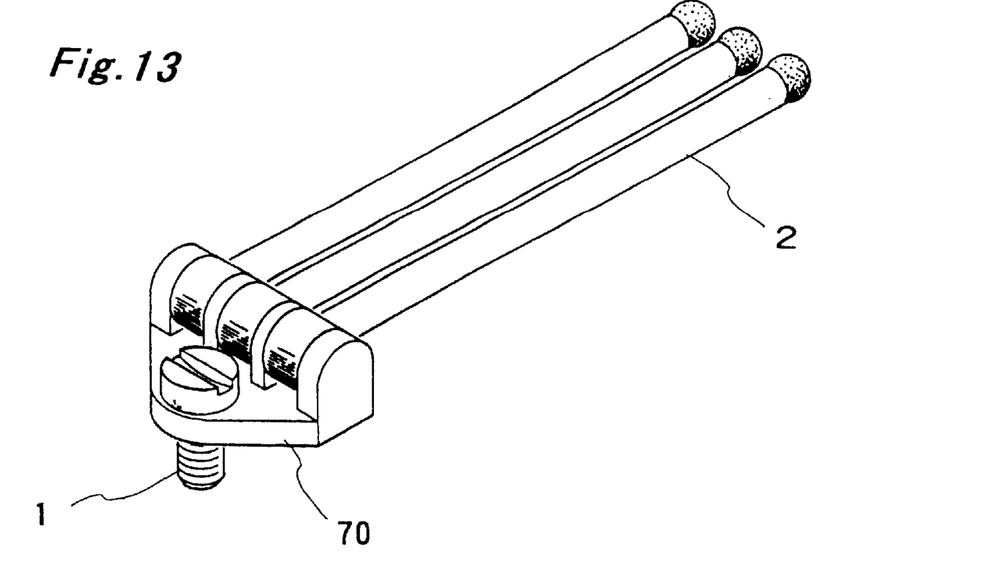
FIG. 13 is a perspective view of the camera supporting structure shown in FIG. 12.

FIG. 12 is an exploded perspective view of still another embodiment. FIG. 13 shows an assembled view of FIG. 12. In this embodiment, the three legs are rotatably placed on the axis parallel to the attached face of the camera supporting structure. Plural leg-attachments 71 (71A to 71D) are aligned on a base 70. A dome-shaped boss 72 is formed on each of the mutually opposite side-faces of the leg-attachments 71. A small boss 73 is formed separate from the boss 72 in order to position each of the opened legs 2 at a required angle. A leg supporting portion 26 is fixed at the end of the leg 2 and has side faces connecting with the mutually opposite side-faces of the leg-attachments 71. A recess 27 is formed on each side face of the leg supporting portion 26 to fit onto the boss 72 of the leg-attachment 71. And further, plural small recesses 28 are formed on the periphery of the recess 27 that is formed on one of the side faces of the leg supporting portion 26 to limit the movement of the leg 2 by fitting onto the small boss 73. All leg-attachments 71 and leg supporting portions 26 have the structures described above. A numeral 74 in the drawing shows a through-hole for the bolt 1.

The leg supporting portion 26 is inserted between the leg-attachments 71A and 71B, and then, the boss 72 is thrust into the recess 27 to add such force as to reform the base. The other legs 2 are assembled in a similar manner to result in the camera supporting structure as shown in FIG. 13.

According to this embodiment, the number of parts is fewer and naturally the number of processes for assembling is fewer and easier, resulting in a reduction in cost. Furthermore, the productivity is improved by producing the base by metal plate working.

Figure 14:
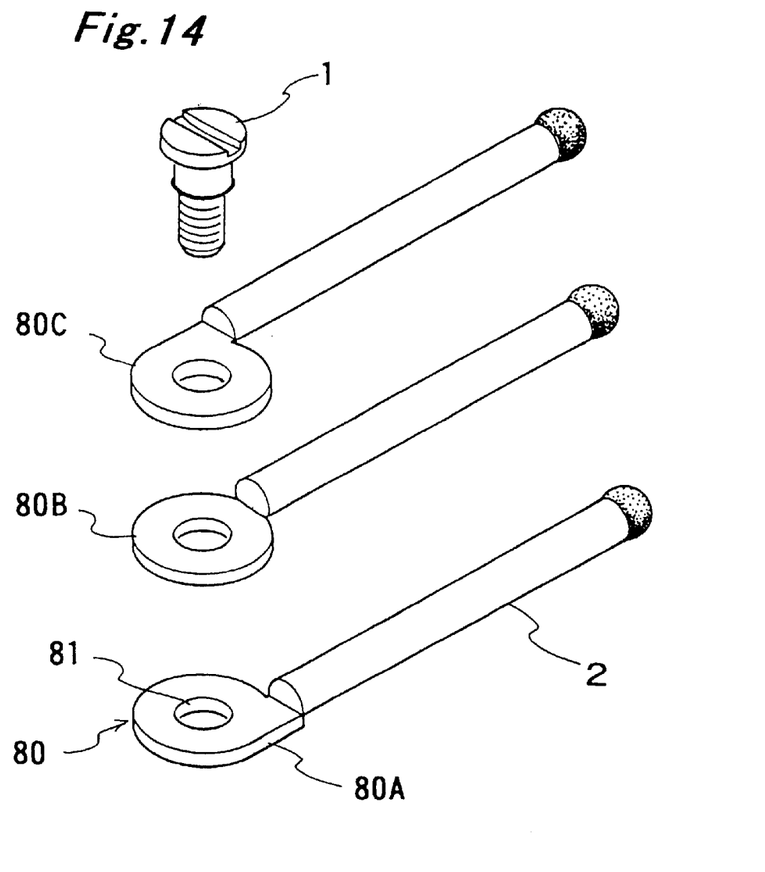
FIG. 14 is an exploded perspective view showing a modification of the embodiment of FIG. 12.
Figure 15:
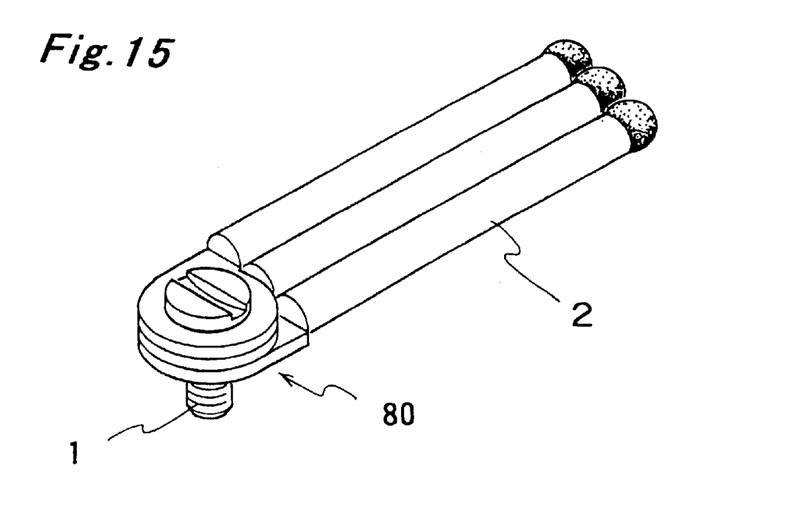
FIG. 15 is a perspective view of the camera supporting structure shown in FIG. 14.

FIG. 14 is an exploded perspective view showing a modification of the embodiment described above. FIG. 15 shows an assembled view of FIG. 14. In this modification, the three legs are rotatably placed in parallel to the attached face of the camera supporting structure. A leg-attachment 80 is formed of a thin disc-shaped member and at the end of the leg 2. The leg-attachment 80 has a through-hole 81 for passing the bolt 1. The leg-attachments 80A, 80B and 80C are respectively coupled with the legs 2 at a different position from one another. More specifically, the leg-attachments 80A and 80C are respectively coupled with the legs 2 at positions distant from the through-hole 81, that is, at positions having a distance approximately the same as the outer diameter of the leg 2. The leg-attachment 80B is coupled with the leg 2 at a position where the center of the through-hole 81 is on an extension from the axis of the leg 2. With the above arrangement, when the multiplied three leg-attachments 80A, 80B and 80C are attached to the camera with the bolt 1, the legs are not mutually obstructed, so that the three legs 2 are screwed to the camera by aligning in the horizontal direction as shown in FIG. 15.

According to this modification, with the above structure having the reduced number of parts and the easy assembling manner, the camera supporting structure having the flexible legs can be provided at a low cost.

Figure 16:
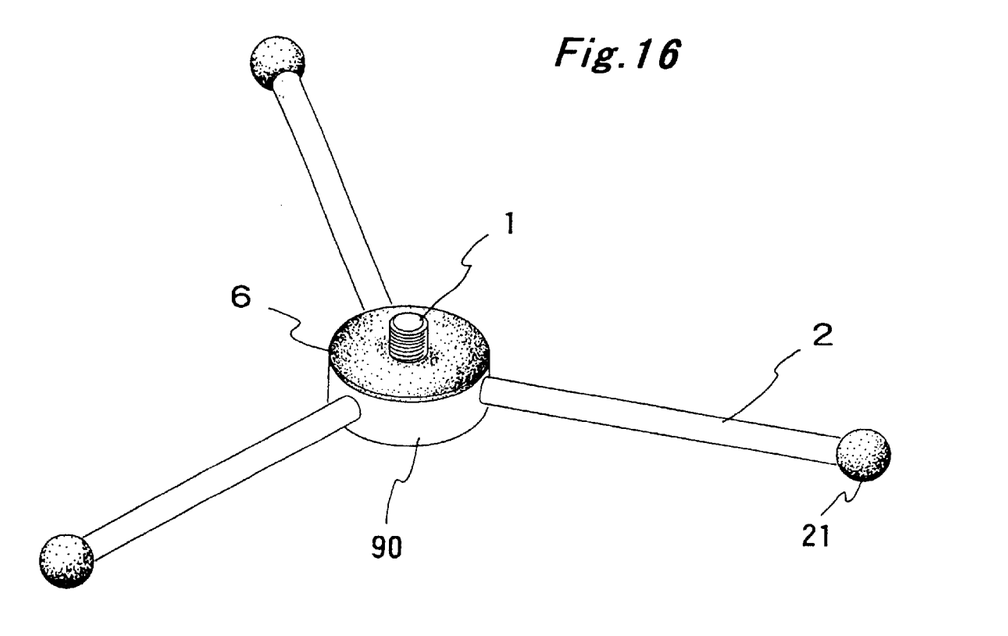
FIG. 16 is a perspective view showing an example of the usage of the camera supporting structure.

FIG. 16 is a perspective view of yet another embodiment. In this embodiment, the flexible legs are fixed on the outer circumferential face of the base. The base 90 is formed as the disc-shaped member having the thickness similar to the diameter of the flexible leg 2. The three flexible legs 2 are secured on the outer circumferential face of the base 90, in which the rubber ball 21 is attached at each end of the legs 2. The screw for attaching the camera 1, which screws into the inner screw of the camera, is formed at the center of the base 90. Further, the cushion 6 is adhered onto the face, formed with the screw 1, of the base 90.

Figure 17:
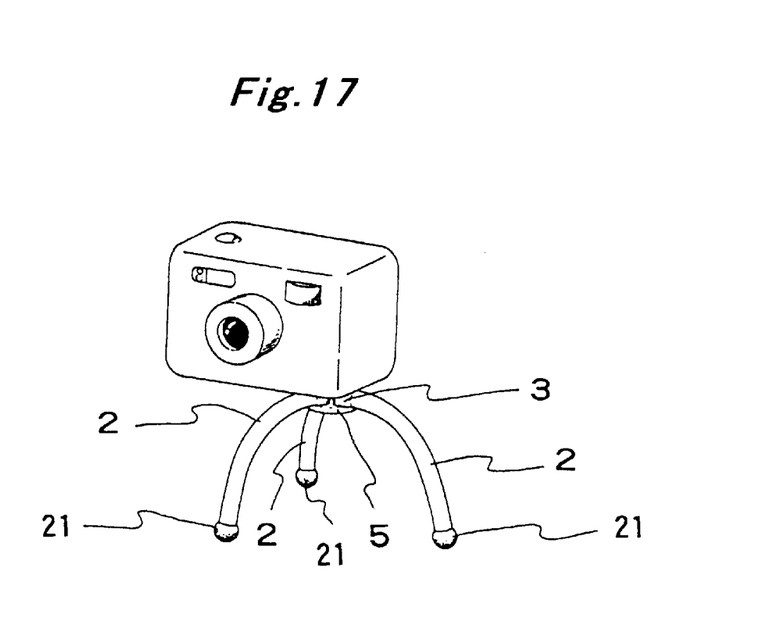
FIG. 17 is a perspective view showing another example of the usage of the camera supporting structure.
Figure 18:
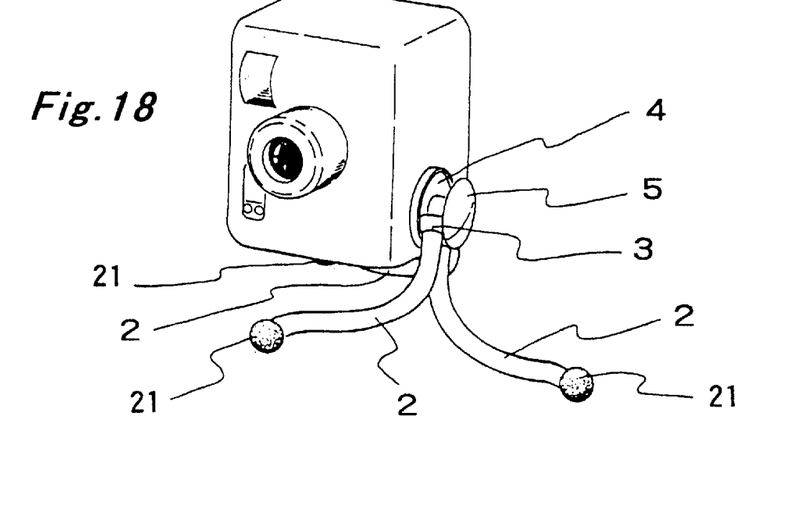
Figure 19:
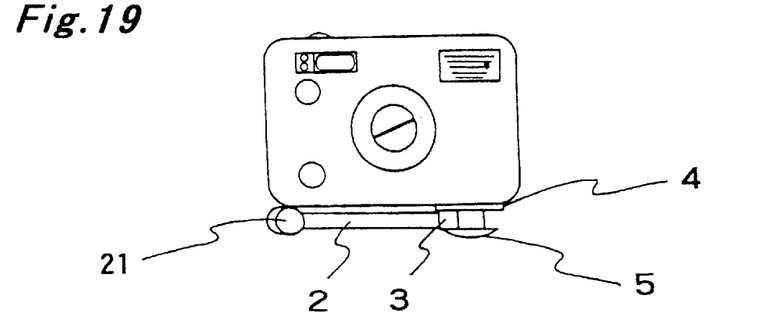
FIG. 19 is a front view showing an example for carrying the camera supporting structure.
Figure 20:
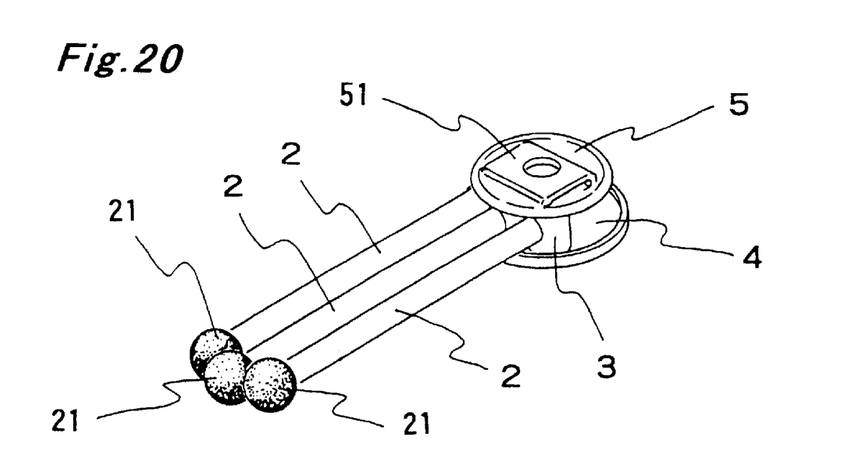
FIG. 20 is a perspective view showing another example for carrying the camera supporting structure.

The usage of the camera supporting structure will be explained below with the case of the camera legged-support explained in FIG. 1. The screw 1 protruding from the base is screwed into the inner screw formed in the camera. As shown in FIG. 17, the camera is oriented toward the subject of the photograph by bending the flexible legs 2 in correspondence to the place where the camera is set. As the manner for attaching the camera onto the supporting structure, the camera can be transversely, as shown in FIG. 17, or vertically, as shown in FIG. 18, attached onto the supporting structure. After taking the photograph, as shown in FIG. 19, the legs 2 may be gathered at one place not to be a nuisance to carry and easy to use. FIG. 20 shows the back of the supporting structure that is removed from the camera for easy portability, in which a hook 51 may be formed on the face of the second member 5 for hanging from a pants' pocket or the like.

What is claimed is:

1. A camera supporting structure for supporting a camera oriented toward a subject of a photograph, comprising:

a plurality of flexible legs;

a first member;

a second member placed parallel to the first member at a spaced interval, wherein said second member has whirl-stop portions for preventing said flexible legs from swinging;

a slider arranged slidably between the first member and the second member for rotating with respect to the first member and the second member, a flexible leg being secured to the side portion of the slider;

a sliding guide for the slider on at least one of the first and second members; and a screw formed on the second member for attaching the camera, the first member being adjacent to the attached camera and having an inner screw for engaging with the screw formed on the second member.

2. A camera supporting structure for supporting a camera oriented toward a subject of a photograph, comprising:

a plurality of flexible legs;

a first member;

a second member placed parallel to the first member at a spaced interval;

a slider arranged slidably between the first member and the second member for rotating with respect to the first member and the second member, a flexible leg being secured to the side portion of the slider;

a sliding guide for the slider on at least one of the first and second members, wherein said sliding guide has an annular wall along the circumferential edge of at least one of said first and second members to project toward said opposite member, said slider being placed on the inside of the annular wall; and a screw formed on the second member for attaching the camera, the first member being adjacent to the attached camera and having an inner screw for engaging with the screw formed on the second member.

3. A camera supporting structure for supporting a camera oriented toward a subject of a photograph, comprising:

a plurality of flexible legs;

a first member and a second member having a through-hole and placed parallel to each other at a spaced interval;

a whirl-stop portion on at least one of said first member and said second members for preventing said flexible leg from swinging;

means for coupling the first member and the second member;

a leg supporting member secured at an end of a flexible leg, the leg supporting member placed between the first member and the second member and moved to rotate with respect to said first member and said second member;

a sleeve inserted into the through-holes of the coupled first and second members for rotation; and a screw for attaching the camera which passes through the sleeve and protrudes from the first member.

4. A camera supporting structure for supporting a camera oriented toward a subject of a photograph, comprising:

a first member having a flat surface facing a supporting structure mounting surface placed adjacent to the attached camera and having a through-hole formed in a central portion of the flat surface;

a second member having substantially the same shape as the first member and provided with a through-hole formed concentrically with the through-hole of the first member;

a plurality of flexible legs each provided with a leg supporting member having a shaft portion at an end;

a screw for attaching the camera to the first member and the second member passing through said through-holes; and at least one of said first member and said second member being provided with shaft holes for rotatably supporting the shaft portions of the leg supporting members and whirl-stop portions for preventing said flexible legs from swinging, whereby said flexible legs are only rotatable in a plane parallel to the supporting structure mounting surface placed adjacent to the attached camera.

5. A camera supporting structure for supporting a camera oriented toward a subject of a photograph, comprising:

a base provided with a through-hole and a plurality of leg attachments disposed concentrically and including a surface facing a supporting structure mounting surface placed adjacent to the attached camera;

a plurality of flexible legs each provided with a leg supporting member rotatably mounted independently on each leg attachment of said base;

a screw for attaching the camera to be engaged with an inner screw threaded on the supporting structure mounting surface placed adjacent to the attached camera; and limiting means provided between the leg supporting member of each flexible leg and said base for limiting the rotational movement of the flexible legs, and further an axis of rotation of said leg supporting member being parallel to the supporting structure mounting surface placed adjacent to the camera, whereby when the flexible legs are parallel to the supporting structure mounting surface placed adjacent to the camera, the flexible legs are put in a position adjacent to the supporting structure mounting surface to be able to accommodate the flexible legs in parallel to the supporting structure mounting surface and by aligning in the horizontal direction.

* * * * *